July 17, 1934.  F. R. ERICSON  1,967,087
QUICK CLOSING THROTTLE VALVE
Filed Nov. 10, 1932
Fig. 1.
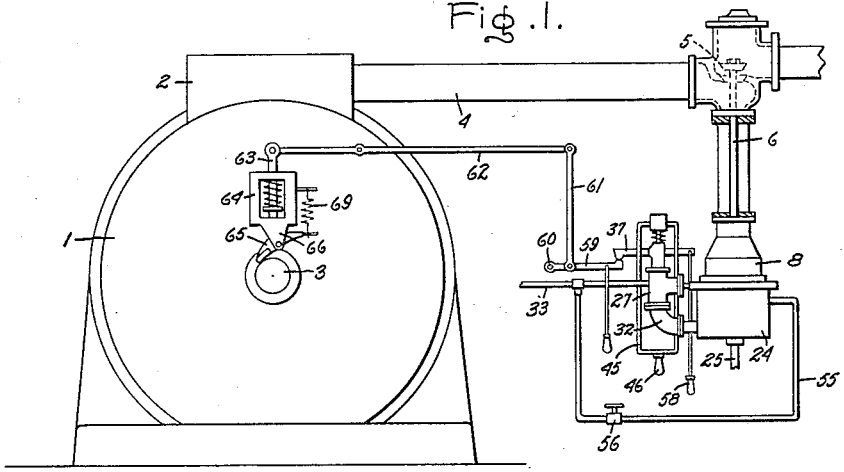
Fig. 2.
Fig. 3.
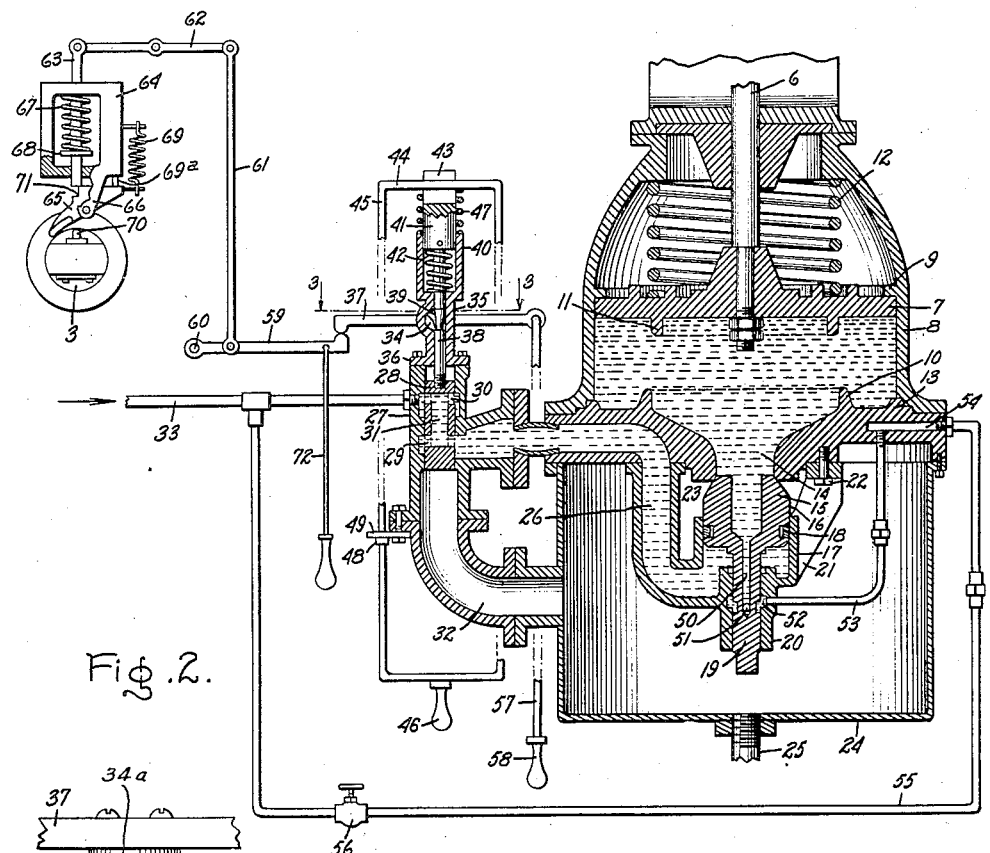
Inventor:
Franklin R. Ericson,
by Chas. V. Mullen
His Attorney.

Patented July 17, 1934

1,967,087

UNITED STATES PATENT OFFICE 1,967,087

QUICK CLOSING THROTTLE VALVE

Franklin R. Ericson, Marblehead, Mass., assignor to General Electric Company, a corporation of New York Application November 10, 1932, Serial No. 642,060

6 Claims. (Cl. 137—139)

The present invention relates to quick closing throttle valves such as are used in connection with elastic fluid turbines, for example, for shutting off the supply of elastic fluid to a turbine in case of abnormal operating conditions, such valves being termed usually emergency valves.

The object of my invention is to provide an improved construction and arrangement in a valve of this type which when operated closes in a minimum of time, and for a consideration of what I believe to be novel and my invention, attention is directed to the following specification and the claims appended thereto.

One application of my invention is in connection with emergency valves for elastic fluid turbines and this application is illustrated in the drawing and specifically described herein. It is to be understood, however, that this is only by way of example and that the invention may be utilized wherever found applicable.

In the drawing, Fig. 1 is a diagrammatic view of an elastic fluid turbine equipped with a throttle valve embodying the invention; Fig. 2 is a sectional view of the operating means for the valve shown on a scale larger than that of Fig. 1, and Fig. 3 is a detail view taken on line 3—3, Fig. 2.

Referring to the drawing, 1 indicates an elastic fluid turbine provided with a valve means 2 which controls the admission of elastic fluid to the turbine. 3 indicates the shaft of the turbine and 4 indicates the supply conduit which supplies elastic fluid to the valve chest of valve means 2. The elastic fluid turbine and the valve means are illustrated only in outline, the specific construction forming no part of the present invention.

In supply conduit 4 is located a quick closing throttle valve 5 of suitable construction, the stem of the valve being indicated at 6. Throttle valve 5 (shown diagrammatically in Fig. 1) may be a usual type of valve which is opened when stem 6 is moved upward and is closed when the stem moves downward.

The lower end of stem 6 is connected to a piston 7 located in cylinder 8. Upward movement of piston 7 in the cylinder is limited by an annular stop 9 and downward movement is limited by an annular stop 10. On the under surface of piston 7 is an annular flange 11 which, when the valve is closed, seats against the inner surface of annular stop 10. Valve 5 is biased toward closed position by its weight and the weight of piston 7 and also by a spring 12 located between the upper surface of piston 7 and the top of cylinder 8.

The lower end of cylinder 8 is closed by a head 13 fastened in place by suitable bolts, not shown. At the center of cylinder head 13 is a discharge opening 14 adapted to be closed by a valve 15. The lower end of valve 15 is in the form of a piston 16 which slides on a cylinder 17, 18 being a suitable packing ring to prevent leakage between the piston and the wall of the cylinder. Connected to piston 16 is a stem 19 which slides in a sleeve 20 which forms a part of cylinder 17. Cylinder 17 is located in spaced relation to head 13 being supported by suitable webs 21 connected to head 13 by bolts 22. This provides a discharge opening 23 which, when the valve 15 is open, is connected directly to discharge opening 14 in head 13. Discharge opening 23 is connected to a suitable receptacle which in the present instance is shown as being a small tank 24 bolted directly to head 13. Connected to the lower end of receptacle 24 is a pipe 25 which may lead to any suitable region of lower pressure such as, for example, a storage tank.

Connected to cylinder 17 is a conduit 26 which leads to a valve casing 27 in which is located a valve 28. In valve 28 are transverse openings 29 and 30 which communicate with a central longitudinal opening 31. Connected to the lower end of valve casing 27 is a discharge conduit 32 which at its lower end is connected to tank 24. Connected to the upper portion of valve casing 27 is a supply pipe 33 which may lead from any suitable source of fluid pressure such as, for example, in the case of an elastic fluid turbine, the oil pump which supplies oil for the valve gear and bearings, this being a convenient source of oil pressure supply. When valve 28 is in the position shown in Fig. 2 of the drawing, the lower end of cylinder 17 is connected by way of conduit 26 and valve passages 29, 31, and 30 to pressure pipe 33 so that piston 16 is subjected to fluid pressure to normally hold it in closed position as shown in Fig. 2. When valve 28 moves upward in cylinder 27, it shuts off the supply of fluid pressure from pipe 33 and at the same time connects conduit 26 to discharge conduit 32, inasmuch as the lower end of valve 28 uncovers conduit 26 where it connects with valve casing 27.

Valve 28 is held normally in the position shown in Fig. 2 by a catch 34 carried on a shaft 34a pivoted in a sleeve 35 which forms a part of the head 36 of valve casing 27. Catch 34 may be formed as an integral part of shaft 34a. Connected to shaft 34a is a lever arm 37. The stem 38 of valve 28 is provided with an annular groove 39 which forms a shoulder with which catch 34 engages. A suitable spring (not shown) may be provided for normally holding catch 34 in engagement with the shoulder. On the upper end of sleeve 35 is a cylinder 40 in which is located a plunger 41 connected to stem 38. In cylinder 40 surrounding stem 38 is a spring 42 which acts in a direction to move plunger 41 upward. When the parts are in the position shown in Fig. 2 with catch 34 in engagement with the shoulder on stem 38, spring 42 is held under compression. When catch 34 is moved from engagement with the shoulder on stem 38, spring 42 forces plunger 41 upward, thus lifting valve 28 and reversing the connections controlled by valve 28 as pointed out above.

In the upper end of plunger 41 is a transverse slot 43 in which is located the end piece 44 of a rectangular frame 45. The lower end of frame 45 is provided with an operating handle 46. Located between the under side of end piece 44 and the upper end of cylinder 40 is a spring 47 which normally urges the frame upward, upward movement being limited by a collar 48 on the frame which engages a fixed stop 49 attached to conduit 32. When valve 28 is moved to its upper position after having been released by catch 34, it may be moved back to normal position by pulling downward on frame 45, the frame restoring the valve to its normal position against the action of spring 42.

Valve 15 and stem 19 are provided with an axially extending passage 50 which communicates through one or more openings 51 in stem 19 with an annular space 52 in sleeve 20. Annular space 52 is connected by a pipe 53, a passage 54 in head 13 and a pipe 55 with the source of fluid pressure 33, there being provided in pipe 55 a suitable control valve 56. When valve 56 is open, oil pressure is supplied through pipe 55, passage 54, pipe 53, annular chamber 52, holes 51 and passage 50 to cylinder 8 beneath piston 7, the pressure building up under the piston and moving it to its uppermost position as shown in Fig. 2 wherein it holds valve 5 open.

Catch lever 37 is arranged to be operated either manually or automatically in response to an abnormal operating condition of the turbine. For manual operation, there is connected to one end of lever 37 a rod 57 having a handle 58 at its lower end. For automatic operation, catch lever 37 is shown as having its left hand end in engagement with an arm 59 pivoted at 60 and connected by a link 61 to a pivoted lever 62 which forms a part of a known type of emergency governing mechanism such as is used in connection with elastic fluid turbines. The emergency governing mechanism is shown more or less diagrammatically as comprising a rod 63 pivoted to the end of lever 62 and projecting down through a casing 64 in proximity to a trip finger 65 pivoted between projections 66 on casing 64. Surrounding rod 63 is a spring 67 located between a collar 68 fixed on the rod and the top wall of case 64. Spring 67 tends normally to force rod 63 downward. The rod is held in its uppermost position by a trip finger 65 upon the upper edge of which it rests. A spring 69 tends normally to turn trip finger 65 in an anti-clockwise direction as viewed in Fig. 2, holding it against a fixed stop 69a on casing 64. Carried by turbine shaft 3 is an emergency governor, here indicated as comprising a spring pressed plunger 70 which, in case the speed of the turbine exceeds a predetermined high value, flies outward and strikes trip finger 65, thus turning it in a clockwise direction to release plunger 63 and permit it to drop downward on to a shoulder 71 on the trip finger, thereby turning lever 62. The construction and operation of an emergency governor of this type is well understood and further description is unnecessary. It may be an emergency governor of the type shown in the patent to Dickinson, No. 1,662,104, March 13, 1928, for example. At 72 is a resetting rod attached to arm 59.

The operation is as follows:

Normally, valve 5 is held in open position by fluid pressure acting on the underside of piston 7, the piston being in its uppermost position as shown in Fig. 2. The fluid pressure is admitted to the underside of the piston from pipe 33 through pipe 55, passage 54, pipe 53, openings 51 and passage 50. At the same time, valve 15 is held in closed position, as shown in Fig. 2, by fluid pressure admitted from pipe 33 through valve 28 and passage 26. Valve 28 is held in the position shown in Fig. 2 by catch 34 which engages the shoulder on stem 38. When lever 37 is turned in a clockwise direction, as shown in Fig. 2, either by pulling down on rod 57 or by the emergency governing mechanism turning the arm 59 on its pivot 60, catch 34 is moved from engagement with the shoulder on stem 38, thus releasing valve 28 and permitting spring 42 to force it upward, bringing its upper end into engagement with head 36 of valve casing 27. When valve 28 moves upward, its central portion shuts off the flow of fluid pressure from pipe 33 to passage 26 and at the same time passage 26 is connected with discharge passage 32 by reason of the fact that the lower end of valve 28 moves above the lower portion of passage 26 where it connects with valve casing 27. This relieves the fluid pressure on the underside of piston 15 whereupon the fluid pressure in valve casing 8 beneath piston 7, coupled with the weight of valve 15, causes latter to drop quickly, moving downward until its lower end engages sleeve 20. When valve 15 uncovers opening 14, the oil is dumped quickly from cylinder 8 beneath piston 7, permitting the piston to move downward to bring valve 7 to closed position. When valve 15 moves downward, the upper portion of stem 19 covers the end of pipe 53 and openings 51 are moved from alignment with annular space 52 to a position where they are covered by the lower portion of sleeve 20. This serves to cut off the supply of fluid pressure through pipe 53 to passage 50. As a result, valve 5 is closed quickly and the fluid pressure supply is cut off entirely from the valve mechanism by the valve 28 and the sleeve 19. To again open valve 5, it is necessary that valve 15 be first closed to cover discharge opening 14. This is accomplished best by first closing valve 56 and then pulling down on frame 45 to restore valve 28 to its normal position, catch 34 again engaging the shoulder on stem 38. If the releasing of catch 34 has been effected by the tripping of the emergency governor, this must be reset before catch 34 can be moved into engagement with the shoulder on stem 38. The emergency governor is reset by pulling downward on handle 72, thus lifting rod 63 against the action of spring 67 and permitting spring 69 to again pull trip finger 45 beneath the lower end of rod 63. The resetting of valve 28 again admits fluid pressure from pipe 33 through passage 26 to the underside of valve 15, forcing it into the closed position. Valve 56 is then opened to admit fluid pressure beneath piston 7 to raise it and open valve 5. It will be noted that fluid pressure supply conduit comprising pipe 55, passage 54 and pipe 53 is relatively small in diameter. This means that fluid pressure is admitted at a low rate so that valve 5 is opened slowly. The rate of opening can be controlled by the hand valve 56.

Discharge opening 14 is of relatively large diameter and when valve 15 moves to uncover it, no obstruction is offered to the flow of fluid pressure from beneath piston 7. In other words, the fluid pressure is quickly relieved, the fluid being dumped from beneath piston 7 very quickly. At the instant of dumping, fluid pressure supply through pipe 53 is shut off. Also, conduit 26 is of relatively large diameter so that when uncovered by valve 28, the pressure on piston 16 is released quickly. It will thus be seen that by my improved construction, I effect quickly the closing of valve 5 and thereafter provide for its opening movement at as slow a rate as is desired. There is no pipe or conduit connected to opening 14, the same discharging into the tank 24. Tank 24 is made large enough to hold all the fluid in cylinder 8. After the fluid is discharged to tank 24, it can run out of it to any point of storage through the pipe 25. The pipe 25 need not be large as the time required for the fluid to run out of tank 24 after it is dumped into it does not in any way affect its rate of flow through opening 14 and hence the quick closing of valve 5.

What I claim as new and desire to secure by Letters Patent in the United States is:

1. In combination, a valve, means biasing the valve toward one position, a piston and cylinder for holding the valve in another position against the action of said biasing means, said cylinder being provided with a dumping port of relatively large diameter, a valve controlling said port, fluid pressure actuated means for holding said second named valve closed, means for releasing the fluid pressure to permit said second named valve to open, and means controlled by said second named valve for supplying fluid pressure to said cylinder when the second valve is seated, said last named means including a sleeve engaging a portion of the second valve and having a port registering with an opening in the second valve when the latter is closed.

2. In combination, a valve, a cylinder having a head with a large opening therein, a piston in the cylinder connected to the said valve, a second valve for said opening, fluid pressure means for holding said second named valve closed, a control valve for said fluid pressure means, means for supplying fluid pressure to said cylinder comprising a member engaging the second valve and permitting flow of fluid through a port in the second valve while the latter is closed, and means for actuating said control valve.

3. In combination, a valve, a cylinder with a piston connected to the valve and fluid under pressure in the cylinder for biasing the valve in one direction, and means for rapidly discharging the fluid from the cylinder to permit the valve to move in the other direction, said means comprising a second valve normally closing a large opening in the cylinder, a tank supported by the cylinder adjacent the opening and a discharge conduit for the tank.

4. In combination, a valve, a cylinder with a piston connected to the valve and fluid under pressure in the cylinder for biasing the valve in one direction, means for rapidly discharging the fluid from the cylinder to permit the valve to move in the other direction, said means comprising a second valve normally closing a large opening in the cylinder, a tank supported by the cylinder adjacent the opening and a discharge conduit for the tank, and means for conducting actuating fluid into the cylinder comprising a fixed sleeve engaging a portion of the second valve, the sleeve having a recess communicating through a port in the second valve with the cylinder, said sleeve serving to interrupt the fluid supply when the second valve is opened.

5. In combination, a valve, a cylinder with a piston connected to the valve and fluid under pressure in the cylinder for biasing the valve in one direction, the cylinder having a lower head with a large opening to permit rapid discharge of the fluid in the cylinder for moving the valve in the opposite direction, means for normally closing the opening comprising a second valve normally seated against the opening, and means including a sleeve engaging the second valve and having a port registering with an opening in the second valve for supplying fluid to the cylinder when the second valve is seated and interrupting the fluid supply when the second valve is opened.

6. In combination, a valve, a cylinder with a piston connected to the valve and fluid under pressure in the cylinder for holding the valve in open position, means for causing rapid closing of the valve comprising a second valve which normally closes a large opening in the bottom of the cylinder, a tank fastened directly to the bottom of the cylinder and a discharge conduit for the tank, and means including a pilot valve for automatically and manually opening the second valve.

FRANKLIN R. ERICSON.